(12) United States Patent
Sano et al.

(10) Patent No.: US 7,531,266 B2
(45) Date of Patent: May 12, 2009

(54) FUEL CELL

(75) Inventors: Seiji Sano, Susono (JP); Yasushi Araki, Gotenba (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 953 days.

(21) Appl. No.: 10/994,345

(22) Filed: Nov. 23, 2004

(65) Prior Publication Data

US 2005/0118490 A1 Jun. 2, 2005

(51) Int. Cl.
*H01M 2/14* (2006.01)
*H01M 8/04* (2006.01)

(52) U.S. Cl. ............................ 429/39; 429/38; 429/26

(58) Field of Classification Search ................. 429/26, 429/38, 39
See application file for complete search history.

(56) References Cited

U.S. PATENT DOCUMENTS

| | | | | |
|---|---|---|---|---|
| 5,503,944 | A | 4/1996 | Meyer et al. | 429/13 |
| 6,303,245 | B1 * | 10/2001 | Nelson | 429/34 |
| 6,492,054 | B1 | 12/2002 | Karakane et al. | 429/34 |
| 2002/0061426 | A1 * | 5/2002 | Imaseki et al. | 429/26 |
| 2002/0076582 | A1 * | 6/2002 | Reiser et al. | 429/13 |
| 2002/0086195 | A1 * | 7/2002 | Gorman et al. | 429/26 |

FOREIGN PATENT DOCUMENTS

| | | |
|---|---|---|
| JP | 06-068896 | 3/1994 |
| JP | 06-132038 | 5/1994 |
| JP | 06-275284 | 9/1994 |
| JP | 09-092308 | 4/1997 |
| JP | 09-283157 | 10/1997 |
| JP | 2000-173633 | 6/2000 |
| JP | 2002-151120 | 5/2002 |
| WO | WO 97/02615 | 1/1997 |
| WO | WO 99/67845 | 12/1999 |
| WO | WO 00/54350 | 9/2000 |

OTHER PUBLICATIONS

European Search Report issued to EP Appln. No. 03703060.8 dated Dec. 20, 2007.

* cited by examiner

*Primary Examiner*—Patrick Ryan
*Assistant Examiner*—Muhammad Siddiquee
(74) *Attorney, Agent, or Firm*—Kenyon & Kenyon LLP

(57) ABSTRACT

In a fuel cell, a porous portion is formed in a separator. At a surface of the porous portion opposite to a surface where a reactant gas passage is formed, a cooling gas passage is formed. The cooling gas passage may be fluidly connected to a reactant gas supply passage for supplying reactant gas to the fuel cell. The cooling gas passage is controllable in flow amount. The porous portion is formed only in a separator portion where a downstream portion of the reactant gas passage is located. At a separator portion where an upstream portion of the reactant gas passage is located, a coolant passage is formed. A rib and a rib-bottom portion have a great porosity. A groove may be filled with porous material. The porous portion may be replaced by a water exchange portion. A portion of the separator other than the region of the porous portion may be made by porous material. Due to these, a fuel cell can be obtained where removal of product water is improved, product water can be utilized for humidifying gas, and product water can be uniformly removed.

20 Claims, 11 Drawing Sheets

FUEL CELL

FIELD OF THE INVENTION

The present invention relates to a fuel cell. More particularly, the present invention relates to a PEFC (Polymer Electrolyte Fuel Cell) in which removal of product water is improved.

BACKGROUND OF THE INVENTION

The PEFC includes a layer of a membrane-electrode assembly (MEA) and a separator. The MEA includes an electrolyte membrane of an ion-exchange membrane and a pair of electrodes disposed on opposite sides of the membrane. The pair of electrodes includes an anode disposed on one side of the membrane and including a first catalyst layer and a cathode disposed on the other side of the membrane and including a second catalyst layer. The separator includes a fuel gas passage formed therein for supplying fuel gas (e.g., hydrogen) to the anode, or an oxidant gas passage for supplying oxidant gas (e.g., oxygen, usually, air) to the cathode, and/or a coolant passage formed therein for letting coolant (usually, cooling water) flow through the coolant passage. A gas diffusion layer may be disposed between the MEA and the separator on an anode side and a cathode side of the MEA.

On the anode side of each cell, there occurs a reaction that hydrogen changes to hydrogen ions (i.e., protons) and electrons. The hydrogen ions move through the electrolyte membrane to the cathode where the hydrogen ions react with oxygen supplied and electrons (which are generated at an anode of the adjacent MEA and move to the cathode of the instant MEA through a separator, or which are generated at an anode of a fuel cell located at one end of a fuel cell stack and move to a cathode of a fuel cell located at the other end of the fuel cell stack through an external electrical circuit) to form water as follows:

At the anode: $H_2 \rightarrow 2H_+ + 2e^-$
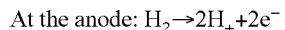
At the cathode: $2H^+ + 2e^- + (½)O_2 \rightarrow H_2O$
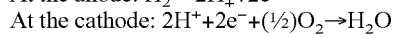

The product water increases in amount in a downstream portion of the oxidant gas passage and is likely to cause flooding. In the flooding region, supply of the oxidant gas to cathode is obstructed, and the above-described reaction does not occur smoothly. As a result, a power generation ability drops. Hence, removal of product water thereby suppressing flooding is important.

A similar problem occurs with the fuel gas passage, since a portion of the water in the oxidant gas passage move through the electrolyte membrane into the fuel gas passage. In order that the above-described reaction is conducted smoothly, the electrolyte membrane has to be properly in a wet state and the oxidant gas and the fuel gas are humidified before being supplied to the fuel cell. Therefore, flooding is more likely to occur.

Japanese Patent Publication No. HEI 11-508726 discloses that an entire portion of a separator is made from porous material and water produced at the cathode is pushed through a porous separator into the cooling water passage so that flooding is prevented.

However, with the fuel cell in which the water produced on the cathode is pushed into the cooling water passage as is disclosed in Japanese Patent Publication No. HEI 11-508726, there are the following problems:

In a case where the cooling water is anti-freeze coolant, some components in the coolant may damage the electrolyte membrane when the coolant moves to the oxidant gas passage. For this reason, pure water is used in the fuel cell of Japanese Patent Publication No. HEI 11-508726, so that operation of the fuel cell at temperatures below the freezing point is impossible. Further, impurities in the oxidant gas passage permeate the separator into the cooling water so that an ion-conductivity of the cooling water increases.

Further, in order to cause the product water to move to/into the cooling water passage, control of a pressure difference between the gas passage and the coolant passage is required, and a system therefor is complex.

Further, since the product water is pushed out into the cooling water, the product water cannot be utilized for humidifying the reactant gas.

Furthermore, uniform pushing out of product water is impossible, since the oxidant passage includes ribs and grooves and a passing-through characteristic of product water is different between the rib portion and the groove portion of the separator.

SUMMARY OF THE INVENTION

A first object of the present invention is to provide a fuel cell where product water can be removed from a gas passage into another gas passage (not a cooling water passage).

A second object of the present invention is to provide a fuel cell where the product water can be utilized again.

A third object of the present invention is to provide a fuel cell where the product water can be substantially uniformly removed at a product water removal region.

The present invention that performs the above-described objects includes the following:

(a) A fuel cell including an MEA and a separator. The separator has an MEA opposing surface where a reactant gas passage is formed. The separator includes a porous portion having a surface opposite to the MEA opposing surface, where a cooling gas passage is formed.

(b) A fuel cell according to item (a) above, wherein the cooling gas passage is connected to a reactant gas supply passage for supplying reactant gas to the fuel cell, on a downstream side of the cooling gas passage.

(c) A fuel cell according to item (a) above, wherein
  (i) a porosity of a rib, or a rib and a rib-bottom portion, of a gas passage of at least one of the reactant gas passage and the cooling gas passage of the porous portion is greater than that of any other portion of the porous portion, or
  (ii) a rib/groove ratio of a gas passage of at least one of the reactant gas passage and the cooling gas passage is smaller at the porous portion than at any portion of the separator other than the porous portion, or
  (iii) the cooling gas passage is filled with a porous material.

(d) A fuel cell including an MEA and a separator. The separator has an MEA opposing surface where a reactant gas passage is formed. The separator includes a water exchange portion having a surface opposite to the MEA opposing surface. On a side of the surface opposite to the MEA opposing surface, a cooling gas passage is formed in the separator.

(e) A fuel cell according to item (a) above, wherein at least a portion of the separator from a reactant gas passage-side surface toward an opposite surface, in at least one region in the reactant gas passage-side surface, is made from porous material.

With the fuel cell according to item (a) above, since the porous portion is formed in the separator and the cooling gas passage is formed in the porous portion at the surface opposite to the MEA opposing surface where the reactant gas passage is formed, product water can move through the porous portion from the reactant gas passage to the cooling gas passage. By using gas of the same kind as the reactant gas as the cooling gas, such problems as flooding and a damage of the electrolyte membrane, which may occur when cooling water moves into the reactant gas, will not occur even if the cooling gas moves into the reactant gas passage.

With the fuel cell according to item (b) above, since the cooling gas passage is connected on the downstream side thereof to the reactant gas supply passage for supplying reactant gas to the fuel cell, the product water which has moved to the cooling gas passage flows to the reactant gas to be supplied to the fuel cell and is utilized for humidifying the reactant gas.

With the fuel cell according to item (c) above, by adopting at least one structure of the greater porosity at the rib than any other portion of the porous portion, the greater porosity at the rib and the rib-bottom portion than any other portion of the porous portion, the smaller rib-to-groove ratio at the porous portion than any other portion of the separator, and filling the cooling gas passage with a porous material, movement of product water from the reactant gas passage to the cooling gas passage is made uniform at the porous portion.

With the fuel cell according to item (d) above, by replacing the porous portion by the water exchange portion, the cooling gas on one side of the water exchange portion and the reactant gas on the other side of the water exchange portion may be different in kind from each other.

With the fuel cell according to item (e) above, since at least a portion of the reactant gas passage-side surface of the separator is formed with a porous material, a water-removal feature and a gas supply feature to the electrode at the MEA opposing surface of the separator are improved.

BRIEF DESCRIPTION OF THE DRAWINGS

The fuel cell of the present invention will now be described with reference to the accompanying drawings, in which.

DETAILED DESCRIPTION OF THE PREFERRED EMBODIMENTS

A fuel cell according to the present invention will be explained with reference to FIGS. 1-18.

Figure 3:
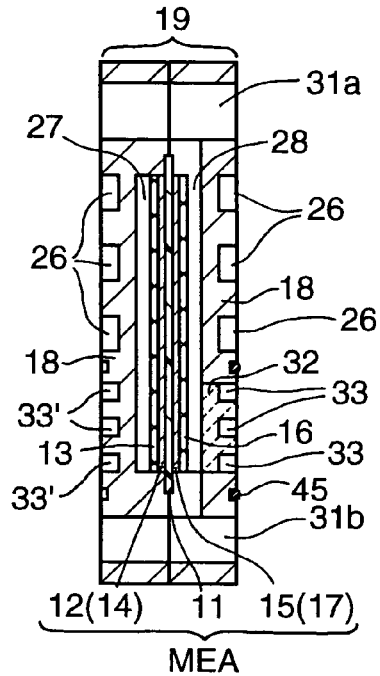
FIG. 3 is a cross-sectional view of the fuel cell according to a first embodiment of the present invention.
Figure 4:
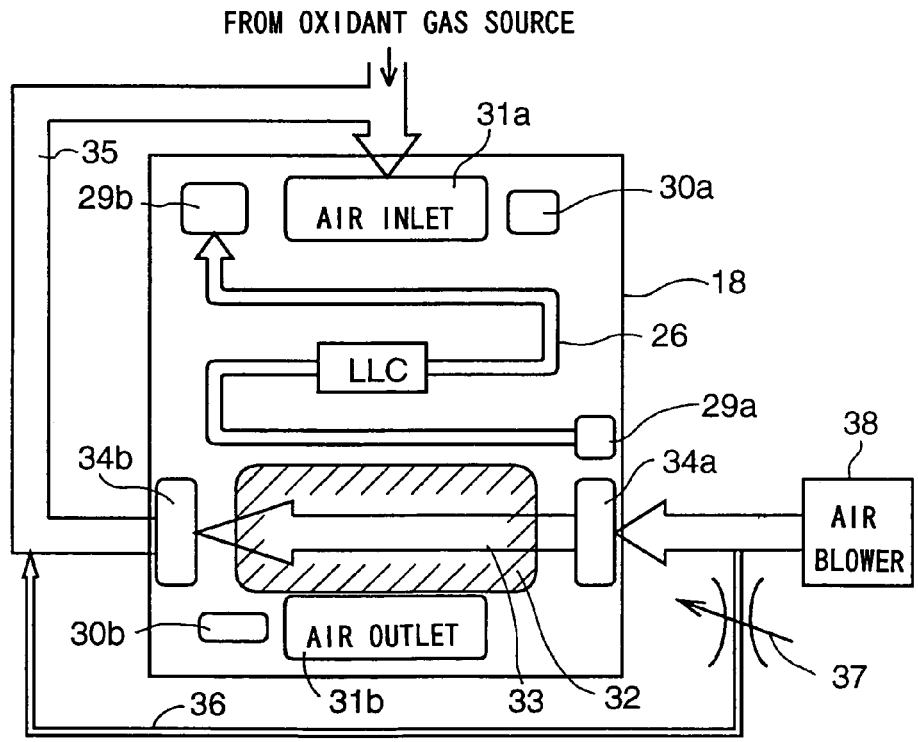
FIG. 4 is a front elevational view of the fuel cell with a diagram of a gas passage, in a case where cooling gas joins reactant gas, according to the first embodiment of the present invention.
Figure 5:
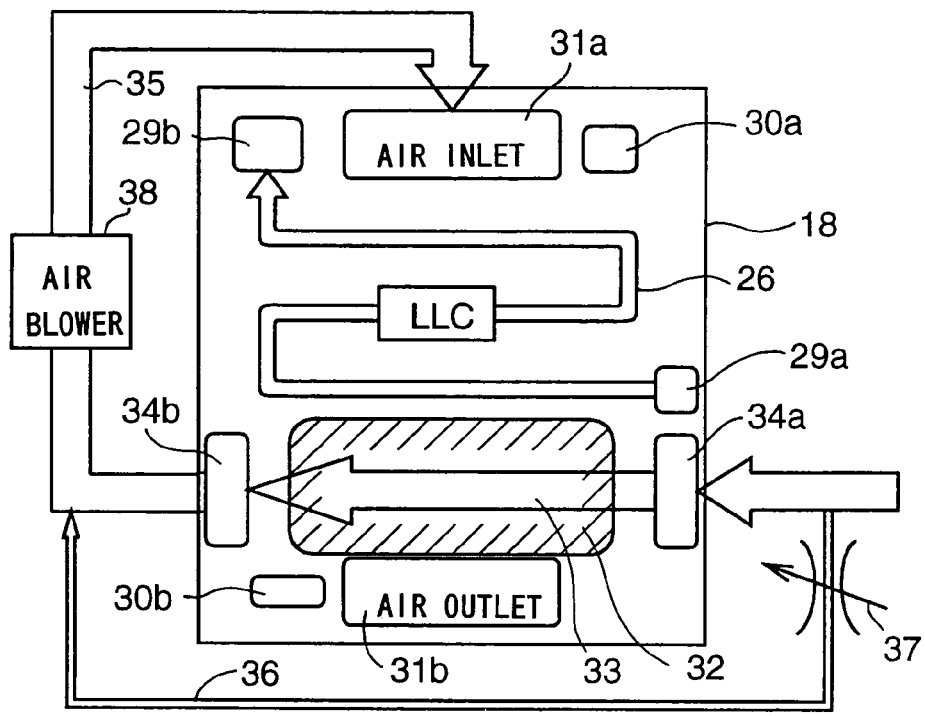
FIG. 5 is a front elevational view of a fuel cell with a diagram of a cooling gas passage and its circuit, according to a second embodiment of the present invention.
Figure 6:
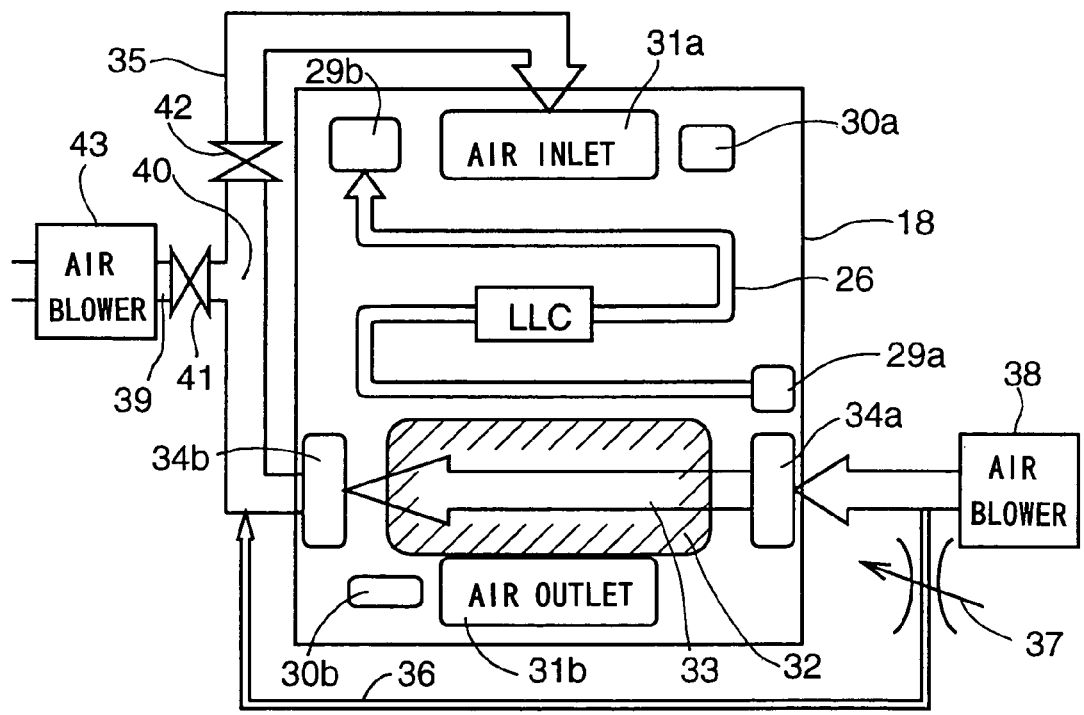
FIG. 6 is a front elevational view of a fuel cell with a diagram of a cooling gas passage and its circuit, according to a third embodiment of the present invention.
Figure 7:
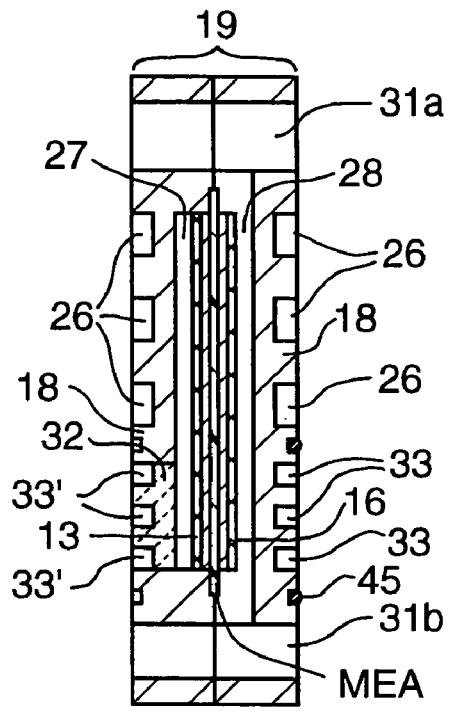
FIG. 7 is a cross-sectional view of a fuel cell according to a fourth embodiment of the present invention.
Figure 8:
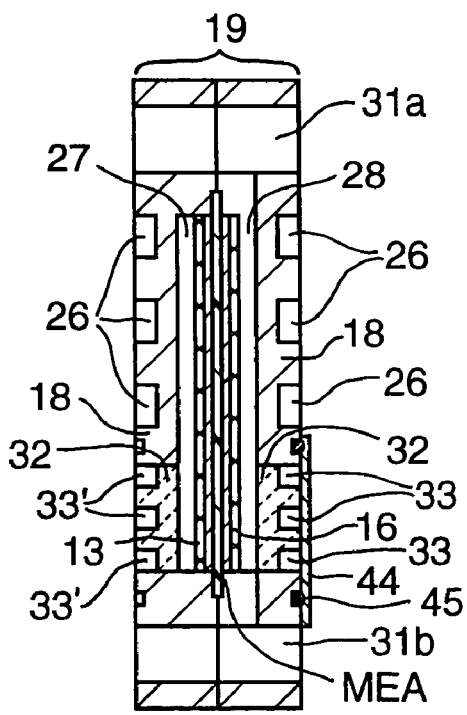
FIG. 8 is a cross-sectional view of a fuel cell according to a fifth embodiment of the present invention.
Figure 9:
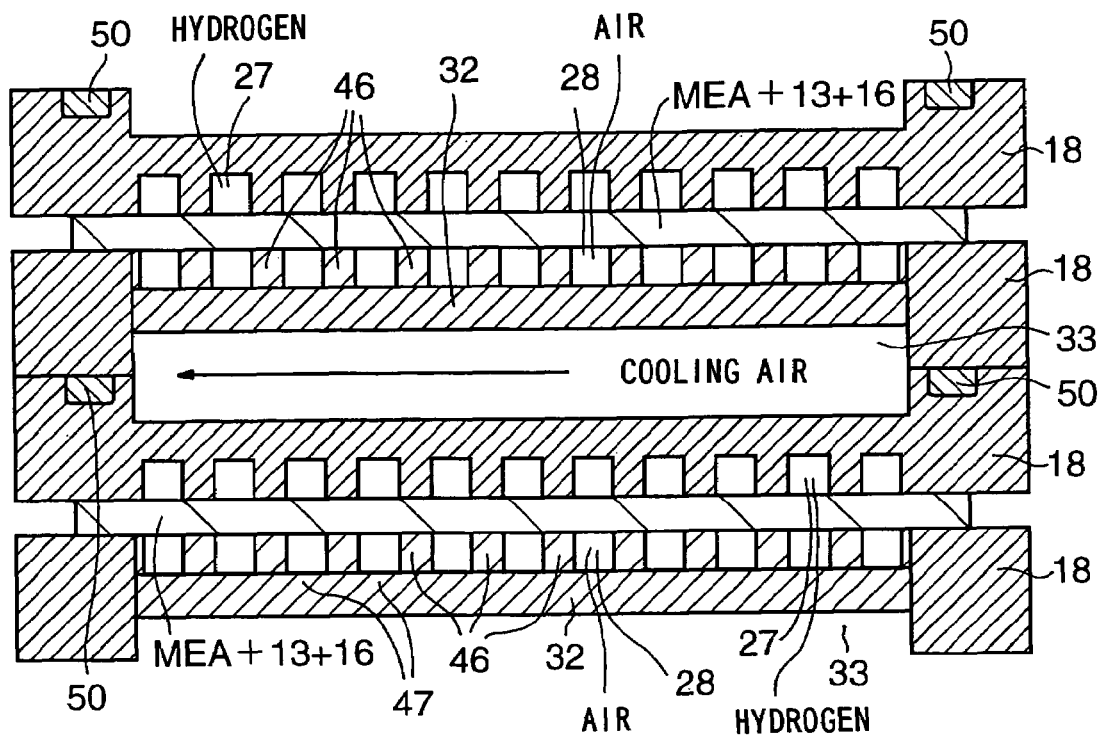
FIG. 9 is a cross-sectional view of a fuel cell according to a sixth embodiment of the present invention (taken along line A-A of FIG. 2)
Figure 10:
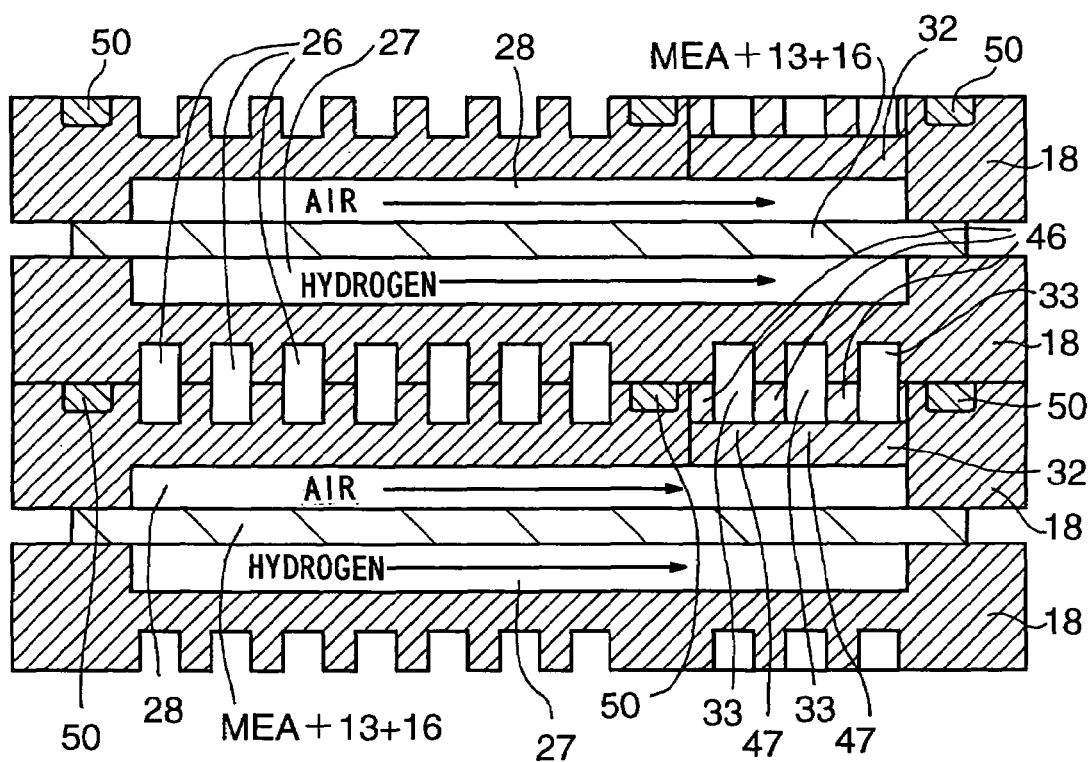
FIG. 10 is a cross-sectional view of the fuel cell according to the sixth embodiment of the present invention (taken along line B-B of FIG. 2)
Figure 11:
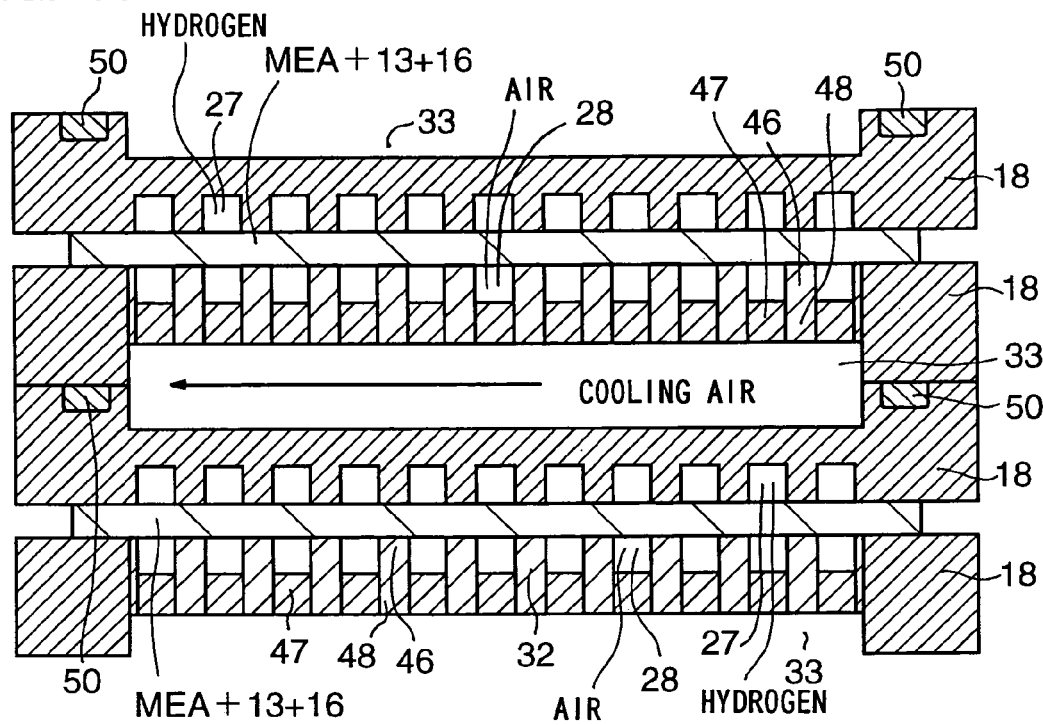
FIG. 11 is a cross-sectional view of a fuel cell according to a seventh embodiment of the present invention.
Figure 12:
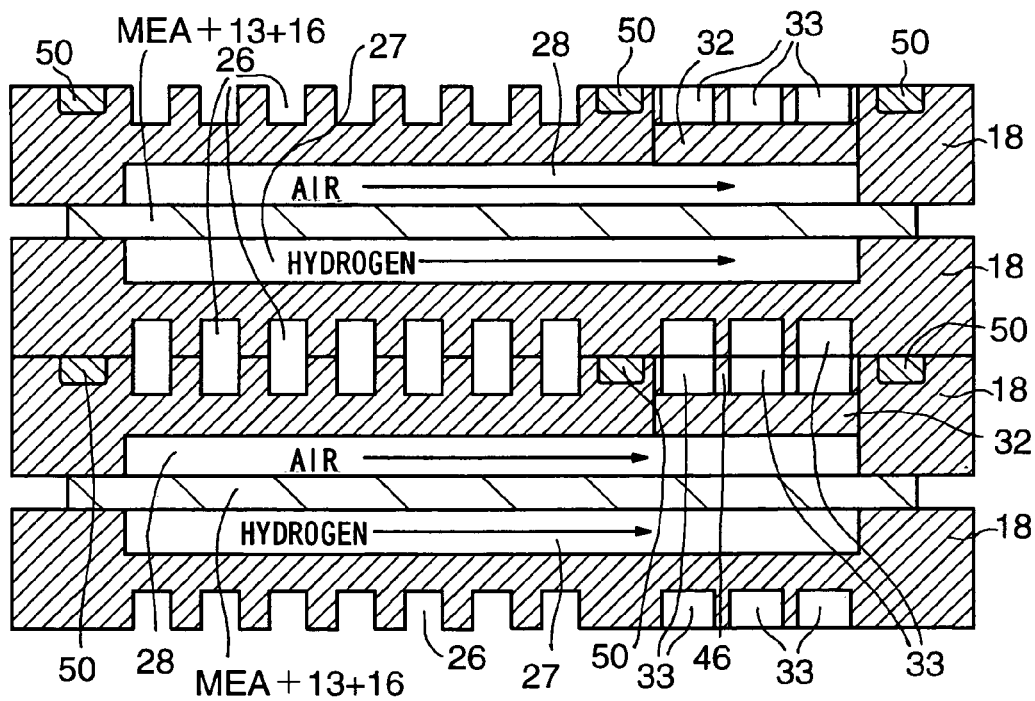
FIG. 12 is a cross-sectional view of a fuel cell according to an eighth embodiment of the present invention.
Figure 13:
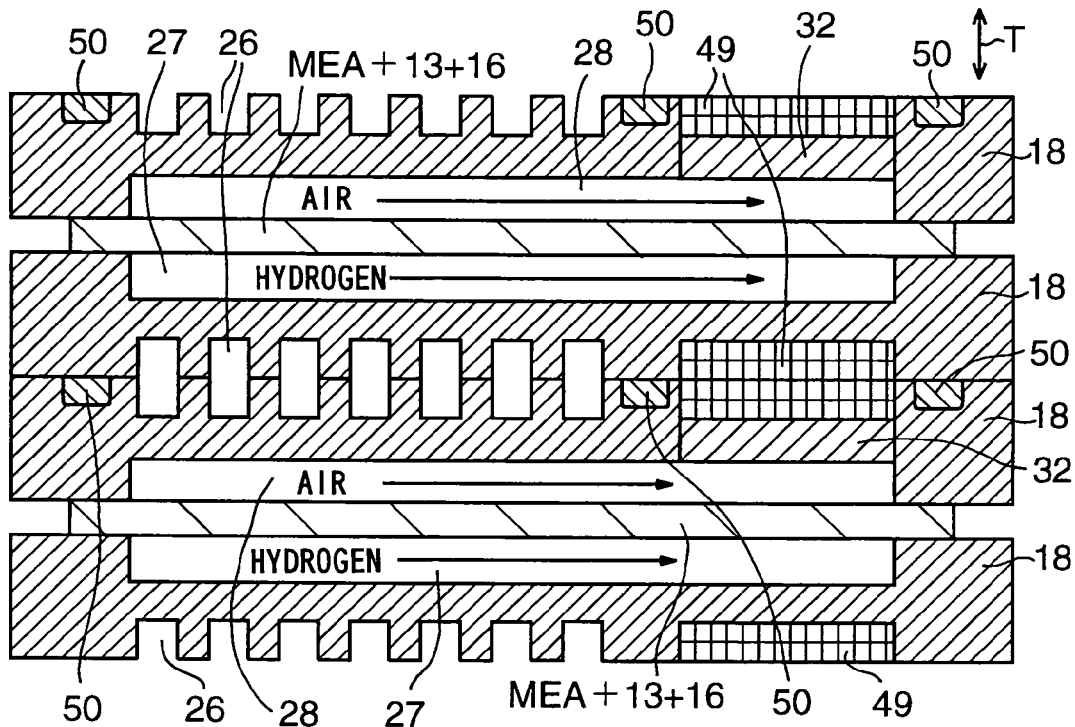
FIG. 13 is a cross-sectional view of a fuel cell according to a ninth embodiment of the present invention (in a case where a porous material for filling a cooling gas passage is formed integrally with a porous portion)
Figure 14:
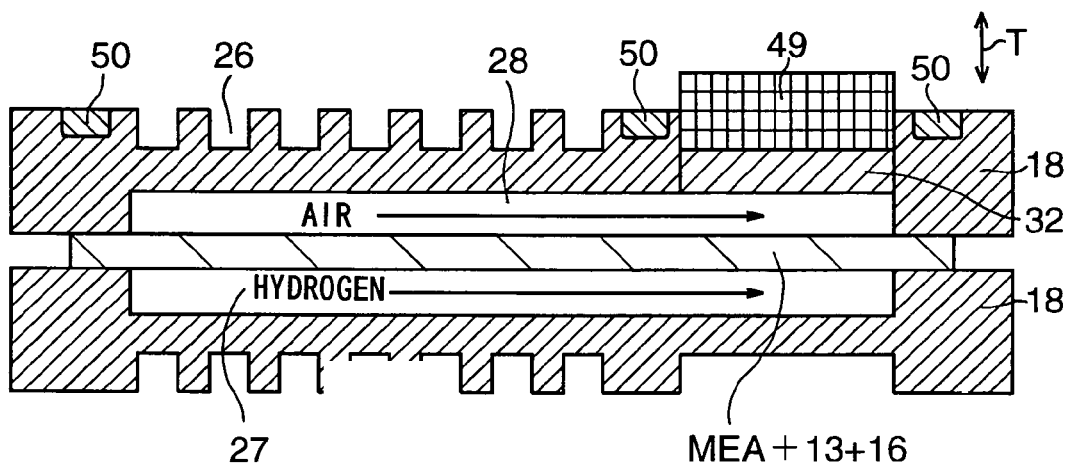
FIG. 14 is a cross-sectional view of the fuel cell according to the ninth embodiment of the present invention (in a case where a porous material for filling the cooling gas passage is formed separately from the porous portion)
Figure 15:
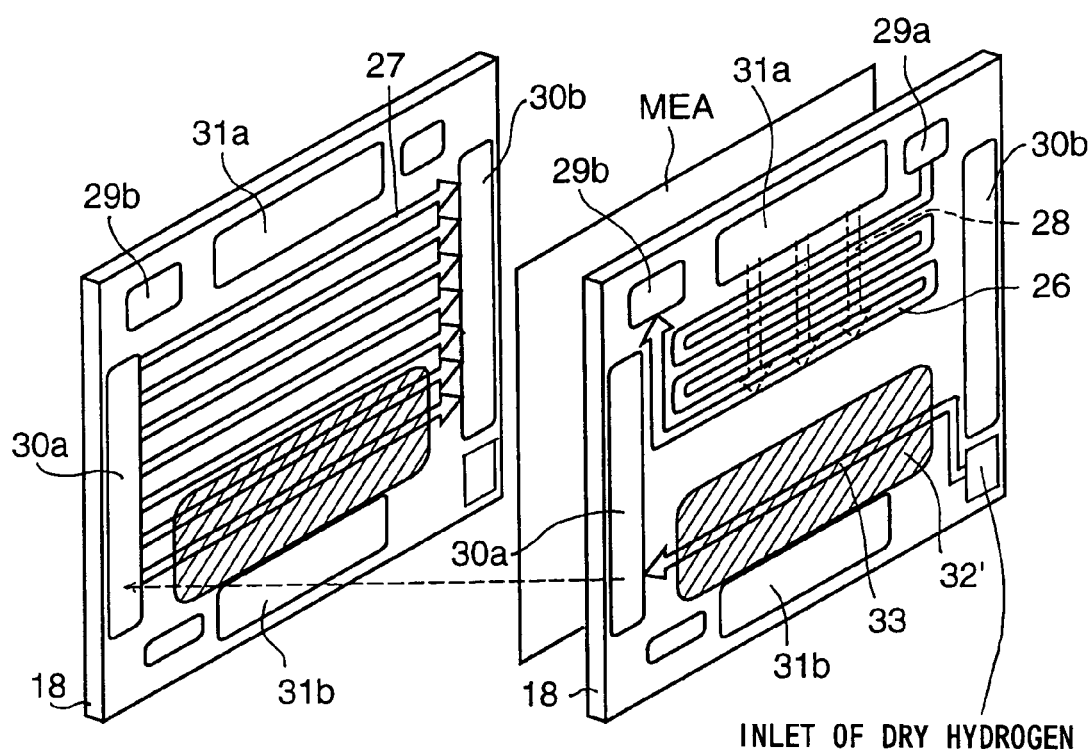
FIG. 15 is a perspective view of a fuel cell according to a tenth embodiment of the present invention.
Figure 16:
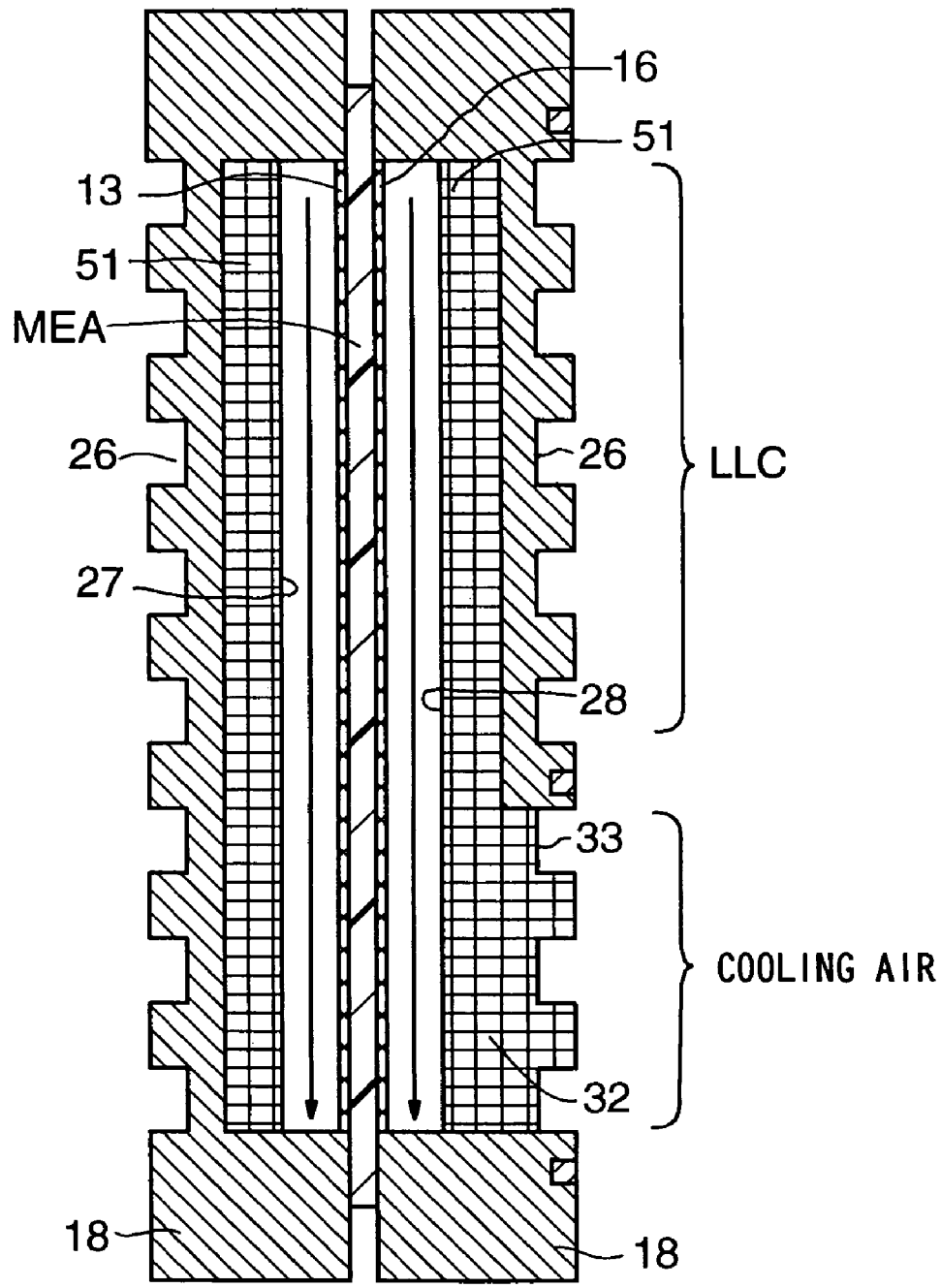
FIG. 16 is a cross-sectional view of a fuel cell, at a groove of the gas passage, according to an eleventh embodiment of the present invention.
Figure 17:
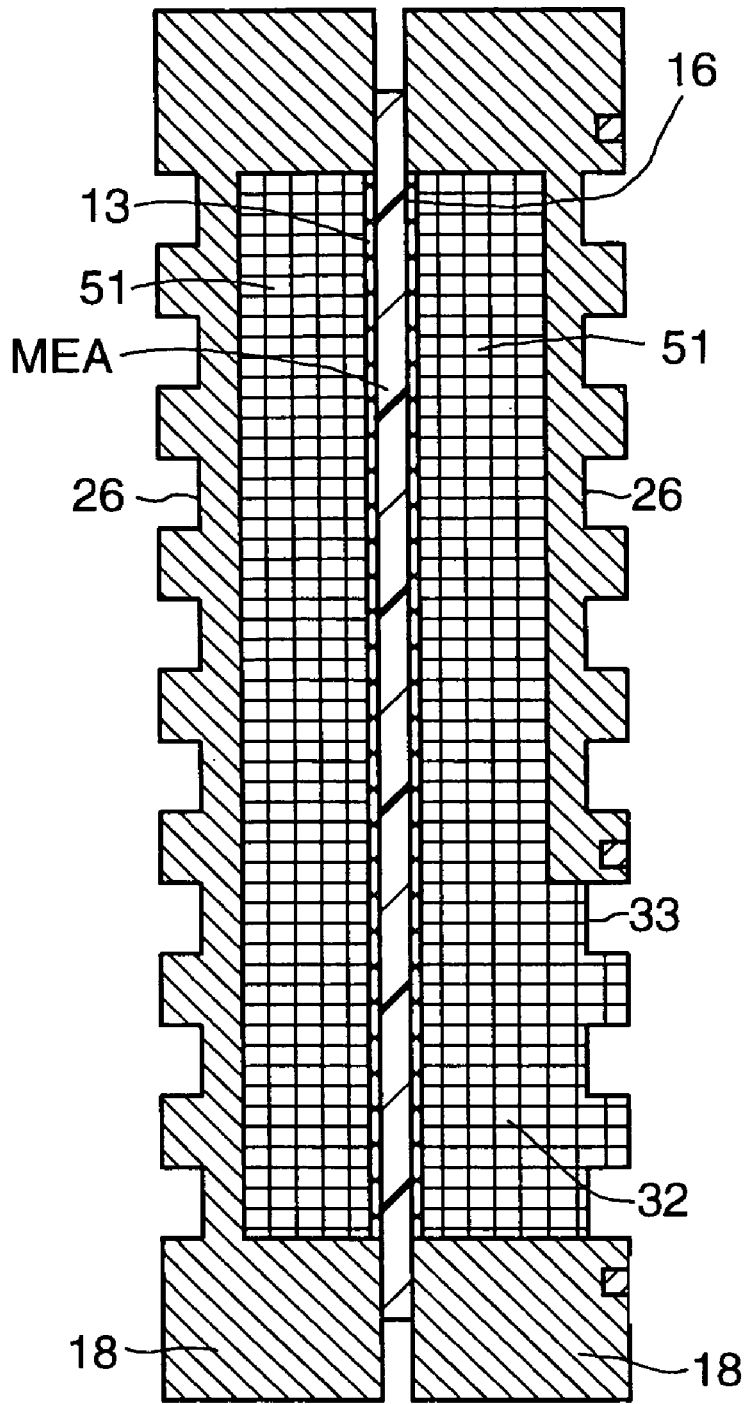
FIG. 17 is a cross-sectional view of a fuel cell, at a rib of the gas passage, according to the eleventh embodiment of the present invention.
Figure 18:
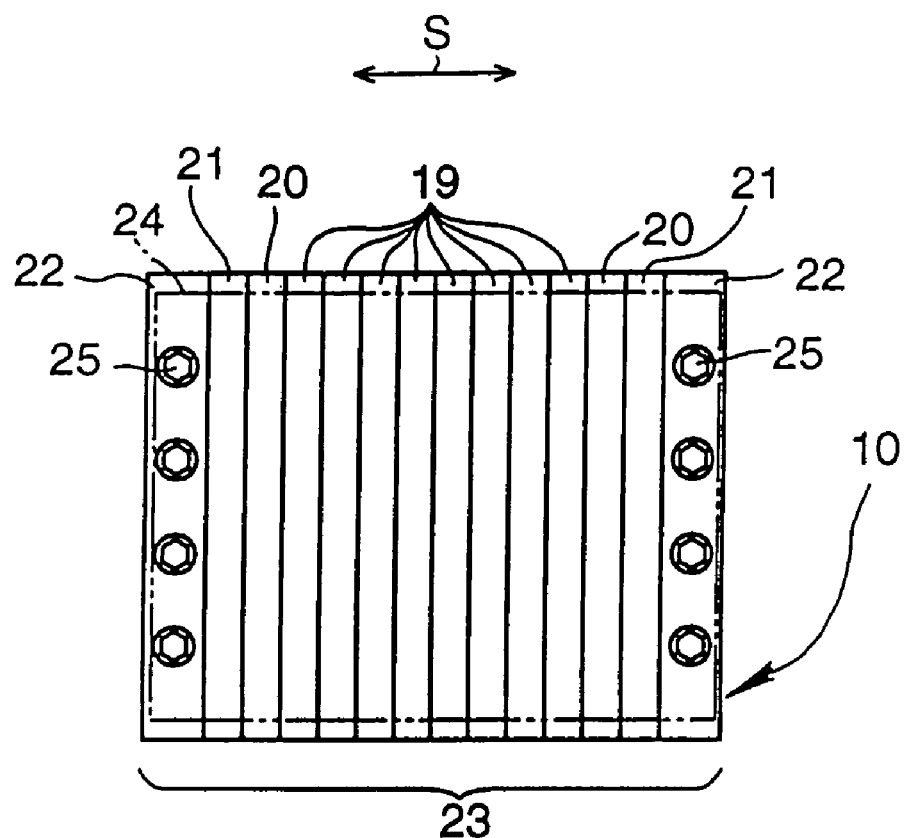
FIG. 18 is a side elevational view of a stack of fuel cells according to the present invention.

FIGS. 1-4 illustrate embodiment 1 of the present invention; FIG. 5 illustrates embodiment 2 of the present invention; FIG. 6 illustrates embodiment 3 of the present invention; FIG. 6 illustrates embodiment 3 of the present invention; FIG. 7 illustrates embodiment 4 of the present invention; FIG. 8 illustrates embodiment 5 of the present invention; FIGS. 9 and 10 illustrate embodiment 6 of the present invention; FIG. 11 illustrates embodiment 7 of the present invention; FIG. 12 illustrates embodiment 8 of the present invention; FIGS. 13 and 14 illustrate embodiment 9 of the present invention; FIG. 15 illustrates embodiment 10 of the present invention; and FIGS. 16 and 17 illustrate embodiment 11 of the present invention. FIG. 18 is applicable to all of the embodiments of the present invention.

Portions common to or similar throughout all of the embodiments of the present invention are denoted with the same reference numerals throughout all of the description and illustrations of the embodiments of the present invention.

First, portions common to or similar throughout all of the embodiments of the present invention will be explained with reference to FIGS. 1-4 and FIGS. 16-18.

A fuel cell 10 of the present invention is of a PEFC (Polymer Electrolyte Fuel Cell)-type. The fuel cell 10 is mounted to, for example, a vehicle. However, the fuel cell 10 may be used for other than a vehicle.

As illustrated in FIG. 3 and FIG. 18, the PEFC 10 includes a layer of a membrane-electrode assembly (MEA) and a separator 18. The MEA includes an electrolyte membrane 11 of an ion-exchange membrane, an electrode 14 (an anode, a fuel electrode) including a catalyst layer 12 disposed on one side of the membrane 11, and an electrode 17 (a cathode, an air electrode) including a catalyst layer 15 disposed on the other side of the membrane 11. Diffusion layers 13 and 16 may be disposed between the MEA and the separators, on the anode side and the cathode side, respectively.

The MEA and the separator 18 are layered thereby forming a unit fuel cell 19. At least one fuel cell 19 forms a module. A plurality of modules are piled, and electrical terminals 20, electrical insulators 21, and end plates 22 are disposed at opposite ends of the pile of modules thereby forming a stack of fuel cells 23. After tightening the stack of fuel cells between the opposite end plates 22 in a fuel cell stacking direction S (FIG. 18), the end plates 22 are coupled to a fastening member (for example, a tension plate 24) extending in the fuel cell stacking direction outside the pile of fuel cells by bolts 25 (extending in a direction perpendicular to the fuel cell stacking direction) or nuts.

A pair of separators 18 disposed on opposite sides of the MEA and opposing to each other includes an anode-side separator and a cathode-side separator. The anode-side separator 18 includes a fuel gas passage 27 formed therein at an MEA opposing surface of the separator, for supplying fuel gas (e.g., hydrogen) to the anode. The cathode-side separator 18 includes an oxidant gas passage 28 formed therein at an MEA opposing surface of the separator, for supplying oxidant gas (e.g., oxygen, usually, air) to the cathode. Each of fuel gas and oxidant gas is called reactant gas, and each of the fuel gas passage 27 and the oxidant gas passage 28 is called a reactant gas passage. Further, the separator 18 includes a coolant (e.g., cooling water) passage 26, formed therein for letting the coolant (e.g., cooling water) flow.

The reactant gas passage 27 and 28 of the separator may be of a straight-type or of a serpentine-type. The reactant gas passage 27 and 28 may be a groove-shaped passage or a group of groove-shaped passages. The passage may be a passage defined between a plurality of protrusions arranged in a zig-zag manner.

Figure 1:
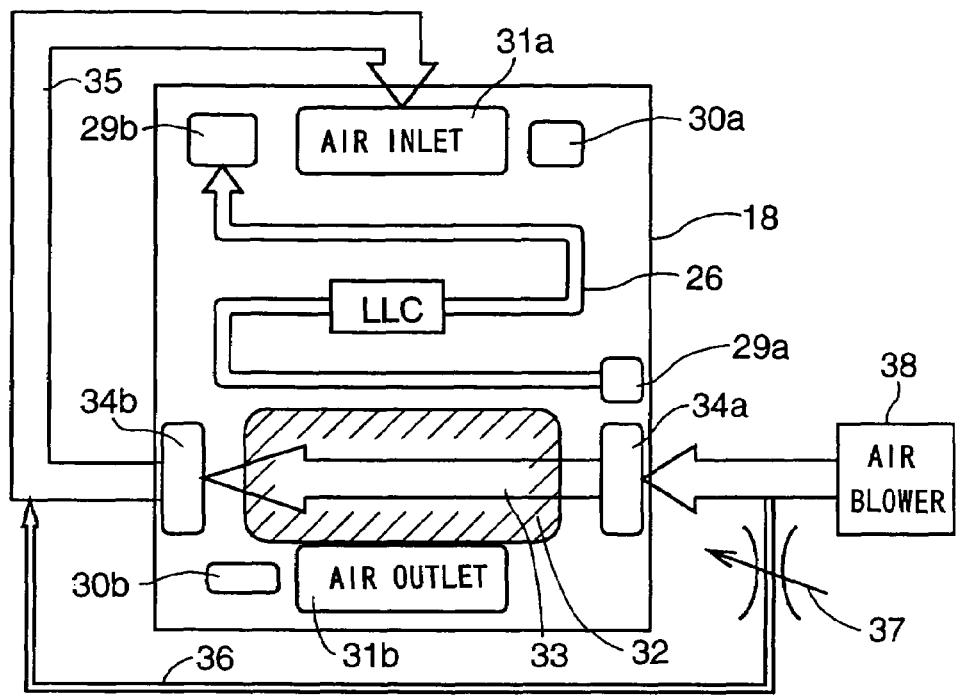
FIG. 1 is a front elevational view of a fuel cell with a diagram of a cooling gas passage and its circuit and a cooling water passage, according to a first embodiment of the present invention (applicable to other embodiments of the present invention)
Figure 2:
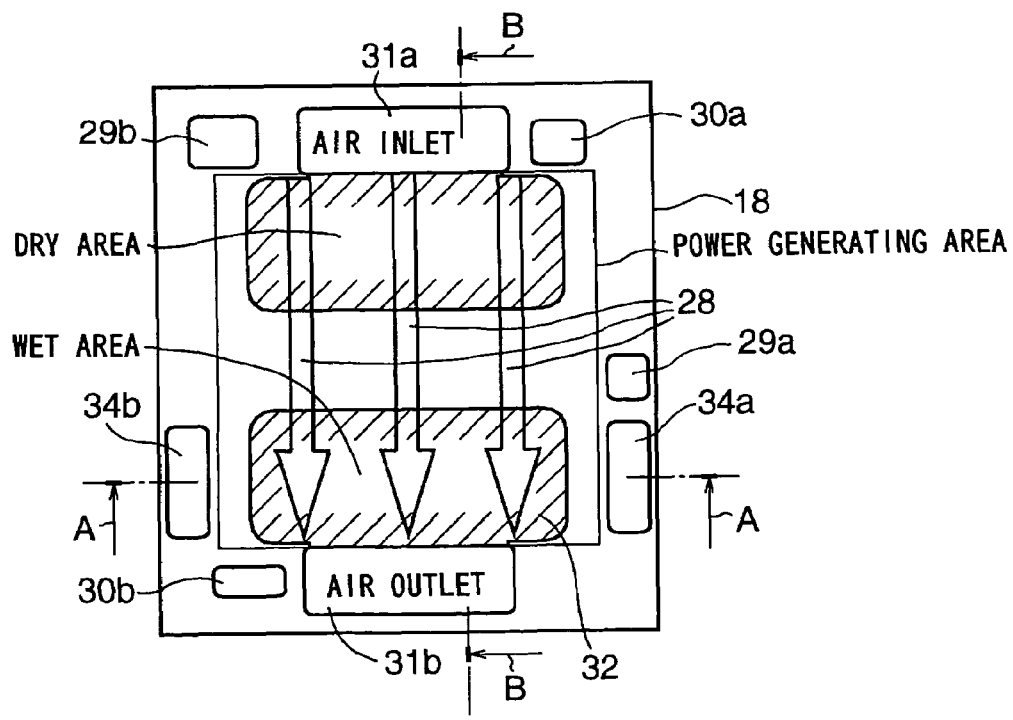
FIG. 2 is a front elevational view of the fuel cell illustrating a reactant gas passage of the fuel cell, according to the present invention.

As illustrated in FIG. 1 and FIG. 2, a coolant (e.g., cooling water) supply manifold 29a, a coolant (e.g., cooling water) exhaust manifold 29b, a fuel gas (e.g., hydrogen) supply manifold 30a, a fuel gas (e.g., hydrogen) exhaust manifold 30b, an oxidant gas (e.g., air) supply manifold 31a and an oxidant gas (e.g., air) exhaust manifold 31b are formed in the separator 18. The coolant (e.g., cooling water) passage 26 formed in the fuel cell plane is connected to the coolant (e.g., cooling water) supply manifold 29a and the coolant (e.g., cooling water) exhaust manifold 29b. The fuel gas passage 27 formed in the fuel cell plane is connected to the fuel gas (e.g., hydrogen) supply manifold 30a and the fuel gas (e.g., hydrogen) exhaust manifold 30b. The oxidant gas passage 28 formed in the fuel cell plane is connected to the oxidant gas (e.g., air) supply manifold 31a and the oxidant gas (e.g., air) exhaust manifold 31b.

The separator 18 is made from any one of carbon (including graphite), metal (including sintered alloy, etc.), an assembly of a metal member and a synthetic resin frame, an electrically conductive synthetic resin, and a combination thereof.

In the fuel cell of the present invention, at at least a portion of a power generating region of the fuel cell, a porous portion 32 is formed in the separator 18, and on a second side of the porous portion 32 opposite to a first side of the porous portion where a reactant gas passage (a gas passage of at least one of the fuel gas passage 27 and the oxidant gas passage 28) is formed, a cooling gas passage 33 is formed in a fuel cell plane.

In the separator 18, a cooling gas supply manifold 34a and a cooling gas exhaust manifold 34b, and the cooling gas passage 33 in the fuel cell plane is connected to the cooling gas supply manifold 34a and the cooling gas exhaust manifold 34b. Cooling gas flows from the cooling gas supply manifold 34a to the cooling gas passage 33 in the fuel cell plane and then flows from the cooling gas passage 33 to the cooling gas exhaust manifold 34b.

The cooling gas passage 33 may be a groove-shaped passage or a group of groove-shaped passages. Further, the cooling gas passage 33 may be a passage defined between a plurality of protrusions arranged in a zigzag manner. The cooling gas passage 33 may be a groove-shaped passage filled with porous material.

A portion of the separator in a direction T of the separator from a reactant gas passage-side surface toward an opposite surface, in at least one region of said reactant gas passage-side surface, is made from a porous material 49 (FIGS. 13, 14).

The porous portion 32 is formed in the separator 18 in at least one region of the fuel cell plane (which may be an entire region of the fuel cell plane) and over an entire thickness of the separator 18 (in a case of a groove portion, over an entire thickness of the separator at a bottom of the groove). The porous portion 32 allows product water and gas (reactant gas and cooling gas) of the fuel cell to pass through the porous portion in a direction of the separator from one surface toward the other, opposite surface of the separator. Since the porous portion 32 is provided, even if product water is produced in the reactant gas passage 27, 28 of the fuel cell, the product water can pass through the porous portion 32 and reach the cooling gas passage 33 to evaporate. As a result, cooling of the fuel cell as well as removal of the product water is performed because the product water takes heat when it is evaporated.

The porous portion 32 is made from electrically conductive material because it is required to have a function of collecting electricity.

It is preferable that the material of porous portion 32 is of the same kind as that of separator for the sake of junction. For example, when the separator 18 is a carbon separator, it is preferable that the porous portion 32 be a porously formed carbon (in this instance, a carbon mold is made porous by properly selecting a shape and a size of carbon particles and a mixing ratio of the carbon particles and a binder). The porous portion 32 may be formed integrally with a remaining portion of the separator, or may be formed separately from the remaining portion of the separator and be coupled to the remaining portion of the separator.

In a structure where the reactant gas passage 27, 28 is formed at one surface of the porous portion 32 and the cooling gas passage 33 is formed at the other surface of the porous portion 32, it is preferable that the cooling gas which flows in the cooling gas passage 33 is of the same kind as the gas which flows in the reactant gas passage 27, 28. More particularly, when air flows in the reactant gas passage 28 formed at one surface of the porous portion 32, air is used as a cooling gas which flows along the other surface of the portion 32. When hydrogen gas flows in the reactant gas passage 27 formed at one surface of the porous portion 32, hydrogen is used as a cooling gas which flows along the other surface of the portion 32. When the gas in the reactant gas passage 27, 28 and that in the cooling passage 33 are of the same kind, such problems as damage to the electrolyte membrane 11 and promotion of flooding do not happen even if the gas moves between the reactant gas passage 27, 28 and the cooling as passage 33, unlike a case where water and gas are opposed to each other, except an embodiment of the present invention illustrated in FIG. 15.

As is illustrated in FIG. 3 and FIG. 7, in a fuel cell which is adjacent to the fuel cell where a first cooling passage 33 is formed, a second cooling gas passage 33' may be formed so as to correspond in position to the first cooling gas passage 33, and gas of the same kind as the gas which flows in the first cooling gas passage 33 (i.e., gas different from the gas flowing in the reactant gas passage of the separator where the second cooling gas passage 33' is formed) may be caused to flow in the second cooling gas passage 33'. The separator where a cooling gas passage 33' is formed should be non-transmissive with gas and water, and in the separator where the coolant gas passage 33' is formed, a separator portion between the reactant gas passage and the coolant gas passage 33' is not a porous portion 32. At a portion of the separator surrounding the cooling gas passages 33 and 33', an O-ring 45 (FIG. 3) is disposed so that the O-ring seals the cooling gas passage 33 and the cooling gas passage 33' from outside. FIG. 3 illustrates a case where oxidant gas flows in the cooling gas passages 33 and 33', and FIG. 7 illustrates a case where fuel gas flows in the cooling gas passages 33 and 33'.

The cooling gas passage 33 is connected, on a downstream side of the cooling gas passage, to a reactant gas supply passage (for example, the reactant gas supply manifold 30a, 31a) for supplying reactant gas to the fuel cell 10. Due to this arrangement, product water is evaporated in the cooling gas passage to humidify the cooling gas, and the humidified cooling gas is supplied to the reactant gas supply manifold and is used as a portion of the reactant gas, whereby the product water can be utilized as water for humidifying the reactant gas.

The connecting passage 35 which connects the cooling gas passage 33 to the reactant gas supply passage on the downstream side of the cooling gas passage 33 may be formed in the fuel cell plane or outside the stack 23. In FIG. 1, the connecting passage 35 fluidly connects the cooling gas exhaust manifold 34b to the reactant gas supply manifolds 30a, 31a, and is arranged outside the stack. The cooling gas of each cell is collected in the cooling gas exhaust manifold 34b, and is supplied to reactant gas supply manifold 30a, 31a via the connecting passage 35. The connecting passage 35 may be arranged within the stack 23 and in each fuel cell plane.

A cooling gas circuit including the cooling gas passage 33 is constructed such that a flow amount of the cooling gas which flows in the cooling gas passage 33 is controllable. For example, a bypass passage 36, which bypasses the cooling gas passage 33 and connects a first portion of the cooling gas circuit located upstream of the cooling gas passage 33 and a second portion of the cooling gas circuit located downstream of the cooling gas passage 33, is provided, and a flow amount control valve 37 is provided in either one of the bypass passage 36 and the cooling gas passage 33 (in FIG. 1, the valve 37 is provided in the bypass passage 36). In this arrangement, by operating the flow amount control valve 37, the flow amount of the cooling gas which flows in the cooling gas passage 33 can be controlled.

A stable operation of the fuel cell can be obtained according to the arrangement including the bypass passage 36, because a change in the flow amount of the cooling gas supplied to the reactant gas supply manifolds 30a, 31a (which is in turn a flow amount of the reactant gas supplied to the fuel cell when no particular reactant gas supply system is provided) is small even when a flow amount of cooling gas flowing through the cooling gas passage 33 is changed. Alternatively, as illustrated in FIG. 4, another reactant gas supply system may be provided where the cooling gas is led into the reactant gas from the reactant gas supply system.

From the viewpoint of removal of product water, it is desirable that a region of the fuel cell plane where the porous portion 32 is provided is as large as possible, while from the viewpoint of cooling of the fuel cell, it is desired that the region of the fuel cell where the porous portion 32 is provided is as small as possible, because cooling by gas is performed at the porous portion 32 and a cooling efficiency in cooling by gas is smaller than that in cooling by water.

In order to make removal of product water and cooling of the fuel cell compatible, when the reactant gas passage 27, 28 is sectioned to three portions including an upstream portion, a midstream portion and a downstream portion, it is preferable that the porous portion 32 is disposed only at a portion (a portion corresponding to "wet zone" in FIG. 2) of the separator where the downstream portion is located. The downstream portion of the reactant gas passage 27, 28 is a portion of the fuel cell where a relatively large amount of water is produced, and by providing the porous portion 32 in that downstream portion, removal of product water is promoted, thereby preventing a power generating ability of that downstream portion from dropping. Further, the gas cooling portion can be restricted to the portion of the fuel cell where the downstream portion of the reactant gas passage 27, 28 is located, whereby the problem from the viewpoint of cooling can be suppressed.

At a portion of the separator except the downstream portion of the reactant gas passage 27, 28 (at a portion of the separator where the upstream portion and the midstream portion of the reactant gas passage 27, 28 is located), the coolant passage 26 through which cooling water flows is disposed. For example, LLC (long life coolant of non-freezing liquid) is used as the coolant. The coolant (e.g., LLC or cooling water) passage 26 and the cooling gas passage 33 in the fuel cell plane are systems independent of each other. A portion of the separator where the upstream portion and the midstream portion of the reactant gas passage 27, 28 are located is a region where the reactant gas concentration is large (much reactant gas yet remains without having been consumed) so that an amount of power generation and an amount of heat generation at that region are relatively large. By cooling the region not by gas but by cooling water, cooling at a high efficiency can be conducted.

In a case where, in the porous portion 32, each of the reactant gas passage 27, 28 and the cooling gas passage 33 is defined by a groove formed between adjacent ribs, it is difficult for the product water to be removed uniformly in the product water removal region, because a product water removal ability of a portion of the separator corresponding to the rib portion is weaker than that of a portion of the separator corresponding to the groove portion.

To enable a uniform removal of product water,
(i) the rib 46 (a portion of the separator closer to a tip of the rib than a bottom surface of the groove), or the rib 46 and a rib-bottom portion 48 (a portion of the separator between a groove bottom surface of the passage 27, 28 and the groove bottom surface of the passage 33) located beneath the rib 46, of a gas passage of at least one of the reactant gas passage 27, 28 and the cooling gas passage 33 of the porous portion 32 may have a greater porosity than any other portion of the porous portion 32; or
(ii) a gas passage of at least one of the reactant gas passage 27, 28 and the cooling gas passage 33 has a smaller rib-to-groove ratio at the porous portion than at any portion of the separator other than the porous portion; or
(iii) the cooling gas passage 33 is filled with a porous material 49. A member 50 is a gasket.

By this structure, movement of product water from the reactant gas passage 27, 28 to the cooling gas passage 33 is made uniform over the region of the porous portion 32.

As is illustrated in FIG. 16 and FIG. 17, a portion of the separator 18 in a direction of the separator from a reactant gas passage-side surface toward an opposite surface of the separator (for example, a rib and rib-bottom portion or a rib portion of the reactant gas passage) may be made from a porous material 51, in at least one region of the reactant gas passage-side surface (for example, in the mid-stream portion of the reactant gas passage, or in the mid-stream portion and the upstream portion of the reactant gas passage). The porous material 51 is integral with the porous portion 32, so that the water absorbed by the porous material 51 can move to the porous portion 32 by capillarity. The porous material 51 may be of the same material and porosity as those of the porous portion 32, or may be different from the porous portion 32 in material and porosity.

In the case where at least one region of the reactant gas passage-side surface of the separator 18 is made from the porous material 51, a water removal feature and a gas supply feature at the electricity collecting surface (the contact surface of the separator with the diffusion layer) are improved. The reason why the gas supply feature is improved is that gas is supplied to a portion of the electrode which is pressed by the rib of the separator not only through the diffusion layer but also through the rib portion made from the porous material 51.

Next, portions unique to each embodiment of the present invention will be explained.

With embodiment 1 of the present invention, as is illustrated in FIGS. 1-4, the cooling gas passage 33 of the separator 18 is fluidly connected to a blower 38 on an upstream side of the cooling gas passage 33. A discharging port of the blower 38 is fluidly connected to the cooling gas supply manifold 34*a*, and an intake port of the blower 38 communicates with a cooling gas source (atmosphere). The cooling gas circuit communicates with the reactant gas supply passage 30*a*, 31*a* (into the oxidant gas supply manifold 31*a*) on the downstream-side of the cooling gas passage 33 via the connecting passage 35. No blower is provided in the connecting passage 35. The cooling gas is used for the reactant gas as it is. In FIG. 1, the cooling gas is air.

At a downstream portion of the reactant gas passage 27, 28 (the oxidant gas passage 2 in the illustrated example), a porous portion 32 is formed. At the MEA opposing surface of the porous portion 32, the reactant gas passage 27, 28 is formed, and on a surface opposite to the MEA opposing surface, of the porous portion 32, the cooling gas passage 33 is formed. Product water moves from the gas passage 27, 28, through a porous portion 32, to the cooling gas passage 33, whereby flooding is suppressed. The water exhausted into the cooling gas passage 33 humidifies the cooling gas. Since the humidified cooling gas is used as reactant gas, a humidifier for humidifying reactant gas, which is required to be provided in a conventional system, is not required to be provided, or a capacity of the humidifier can be reduced. Further, the product water is evaporated accompanied by a large amount of heat absorption of latent heat and heat for raising a temperature of the product water to a boiling point of the product water (sensible heat) when it is moving through the porous portion 32, thereby cooling the fuel cell 10. As a result, both suppression of flooding and cooling of the fuel cell are achieved.

With the flow passage structure of embodiment 1 of the present invention where the reactant gas passages 27, 28 and the cooling gas passage 33 opposing to each other via the porous portion 32, since the reactant gas passages 27, 28 is located downstream of the cooling gas passage 33, a gas pressure at the reactant gas passages 27, 28 is lower than a gas pressure at the cooling gas passage 33, so that gas flows from the cooling gas passage 33 through the porous portion 32 to the reactant gas passages 27, 28. As a result, a concentration of the gas increases at the downstream portion of the reactant gas passage 27, 28, and a power generating ability is raised at the downstream portion of the reactant gas passage 27, 28. Despite flow of the cooling gas from the cooling gas passage 33 to the reactant gas passages 27, 28, the product water can move from the reactant gas passage 27, 28 to the cooling gas passage 33 owing to capillarity and evaporation. In order to lower the pressure of the cooling gas at the porous portion 32 thereby enhancing movement of the product water from the reactant gas passages 27, 28 to the cooling gas passage 33, the cooling gas passage 33 is throttled so that a flow velocity is increased and a static pressure is lowered.

With embodiment 2 of the present invention, as is illustrated in FIG. 5, a blower 38 is disposed in the connecting passage 35 which connects the cooling gas passage 33 and the reactant gas supply passage, on the downstream side of the cooling gas passage 33. A discharge port of the blower 38 is fluidly connected to the reactant gas supply manifold 30*a*, 31*a*, while an intake port of the blower 38 is fluidly connected to the cooling gas exhaust manifold 34*b*. The cooling gas circuit is connected to the reactant gas supply manifold 30*a*, 31*a* (the oxidant gas supply manifold 31*a* in the illustrated example) on the downstream side of the cooling gas passage 33, via the connecting passage 35 and the blower 38. No blower is provided on an upstream side of the cooling gas passage 33. The cooling gas is used as reactant gas as it is. In the example of FIG. 5, the cooling gas is air.

At a downstream portion of the reactant gas passage 27, 28 (the oxidant gas passage 28 in the illustrated example), a porous portion 32 is formed. At the MEA opposing surface of the porous portion 32, the reactant gas passages 27, 28 is formed, while at a surface of the porous portion opposite to the MEA opposing surface, the cooling gas passage 33 is formed. The product water moves from the reactant gas passage 27, 28 through the porous portion 32 to the cooling gas passage 33 to be exhausted, whereby flooding is suppressed. The water exhausted into the cooling gas passage 33 humidifies the cooling gas. Since the humidified cooling gas is used as reactant gas, a humidifier for humidifying reactant gas, which is required to be provided in a conventional system, is not required to be provided, or a capacity of the humidifier can be reduced. Further, the product water is evaporated with a large amount of heat absorption of latent heat and heat for raising a temperature of the product water to a boiling point of the product water when it is moving through the porous portion 32, thereby cooling the fuel cell 10. As a result, both suppression of flooding and cooling of the fuel cell are achieved.

With the flow passage structure of embodiment 2 of the present invention where the reactant gas passages 27, 28 and the cooling gas passage 33 opposing to each other via the porous portion 32, since the blower 35 is disposed in the connecting passage 35, a gas pressure at the reactant gas passages 27, 28 is higher than a gas pressure at the cooling gas passage 33, so that the reactant gas flows from the reactant gas passages 27, 28 through the porous portion 32 to the cooling gas passage 33. The product water can move from the reactant gas passages 27, 28 to the cooling gas passage 33, riding on the flow of the gas. As a result, both removal of product water and suppression of flooding are achieved.

Embodiment 3 of the present invention is an embodiment where a countermeasure for blockage which may happen in the porous portion 32 in embodiment 1 of the present invention is taken.

With embodiment 3 of the present invention, as is illustrated in FIG. 6, the connecting passage 35, which connects the cooling gas passage 33 and the reactant gas supply passage, is connected by a branch tube 39, on the downstream side of the cooling gas passage 33. In the branch tube 39, a second blower 43 is disposed. In the branch tube 39, an open/close valve 41 is provided at a downstream portion of a diverging point 40 of the branch tube 39. In the connecting passage 35, an open/close valve 42 is provided at a downstream of the diverging point 40 of the branch tube 39. The blower 43 may be replaced by another vacuum generating device. The other structures are the same as those of embodiment 1 of the present invention.

During a normal operation of the fuel cell, the open/close valve 42 is open and the open/close valve 41 is closed, while the blower 43 is stopped in operation. When any blockage takes place in the porous portion 32 during operation of the fuel cell, the open/close valve 42 is closed and the open/close valve 41 is opened, while the blower 43 is operated and the blower 38 is stopped. Due to this operation, the cooling gas passage 33 of the porous portion 32 is evacuated whereby foreign substances causing the blockage in the porous portion 32 are sucked out and are removed. After removal of the foreign substances, the open/close valve 42 is opened and the open/close valve 41 is closed, while the blower 43 is stopped and the blower 38 is operated.

With embodiment 4 of the present invention, as illustrated in FIG. 7, the porous portion 32 is formed in the anode-side separator 18. The fuel gas passage 27 is formed at one surface of the porous portion 32, and the cooling gas passage 33' is formed at the other surface of the porous portion 32. Fuel gas (e.g., hydrogen) flows in the cooling gas passage 33'. In a cathode-side separator of an adjacent fuel cell, a cooling gas passage 33 is formed at a surface opposite to an MEA opposing surface where an oxidant gas passage 28 is formed, of the separator of the adjacent fuel cell. The cooling gas passage 33 of the adjacent fuel cell is not partitioned from the cooling gas passage 33' of the instant fuel cell, and fuel gas (e.g., hydrogen) flows the cooling gas passage 33 of the adjacent fuel cell. In the cathode-side separator of the adjacent fuel cell, a separator portion between the oxidant gas passage 33 at one surface of the separator and the cooling gas passage 33 at the other surface of the separator is not made from porous material but from gas-tight material, so that fuel gas (e.g., hydrogen) flowing in the cooling gas passage 33 and oxidant gas (e.g., air) flowing in the oxidant gas passage 33 is not mixed with each other.

Water in the fuel gas passage 27 (water which has moved from the oxidant gas passage 28 to the fuel gas passage 27 through the electrolyte membrane 11) moves to the cooling gas passage 33' through the porous portion 32 being evaporated. As a result, the problem of flooding in the fuel gas passage 27 is solved. Further, evaporation of water absorbs a large amount of heat including latent heat and heat for raising a temperature of the water to a boiling point of the water, whereby the fuel cell is effectively cooled.

Further, the hydrogen flowing in the cooling gas passage 33' is humidified by the water which has moved to the passage through the porous portion 32, and is directly supplied to the fuel gas supply manifold 30 via the connecting passage 35 and is used as fuel gas. As a result, a humidifier for humidifying fuel gas is not required to be provided, and even if provided, it can be of a small capacity.

With embodiment 5 of the present invention, as illustrated in FIG. 8, the porous portion 32 is formed in each of the anode-side separator and the cathode-side separator. In the anode-side separator, the fuel gas passage 27 is formed at one surface of the porous portion 32 and the cooling gas passage 33' is formed at the other surface of the porous portion 32. Fuel gas (e.g., hydrogen) flows in the cooling gas passage 33'. In the cathode-side separator, the oxidant gas passage 28 is formed at one surface of the porous portion 32 and the cooling gas passage 33 is formed at the other surface of the porous portion 32. Oxidant gas (e.g., air) flows in the cooling gas passage 33. In the pile of fuel cells, a partition plate 44 is disposed between the cooling gas passage 33 where oxidant gas flows and the cooling gas passage 33' where fuel gas flows, so that the fuel gas and the air is not mixed with each other.

Water in the fuel gas passage 27 moves through the porous portion 32 being evaporated to the cooling gas passage 33' where fuel gas flows. As a result, flooding in the fuel gas passage 27 is prevented. Further, evaporation of water absorbs a large amount of heat including latent heat and heat for raising a temperature of the water to a boiling point of the water, whereby the fuel cell is effectively cooled. Similarly, product water in the oxidant gas passage 28 moves through the porous portion 32 being evaporated to the cooling gas passage 33 where oxidant gas flows. As a result, flooding in the oxidant gas passage 28 is prevented. Further, evaporation of water absorbs a large amount of heat including latent heat and heat for raising a temperature of the water to a boiling point of the water, whereby the fuel cell is effectively cooled.

Further, the hydrogen flowing in the cooling gas passage 33' is humidified by the water which has moved to the passage through the porous portion 32, and is directly supplied to the fuel gas supply manifold 30a via the connecting passage 35 and is used as fuel gas. As a result, a humidifier for humidifying fuel gas is not required to be provided, and even if provided, it can be of a small capacity. Similarly, the air flowing in the cooling gas passage 33 is humidified by the water which has moved to the passage through the porous portion 32, and is directly supplied to the oxidant gas supply manifold 31a via the connecting passage 35 and is used as oxidant gas. As a result, a humidifier for humidifying oxidant gas is not required to be provided, and even if provided, it can be of a small capacity.

With embodiment 6 of the present invention, as illustrated in FIG. 9 (which is a cross section taken along line A-A in FIG. 2) and FIG. 10 (which is a cross section taken along line B-B in FIG. 2), at least one gas passage (in FIGS. 9 and 10, both gas passages) of the reactant gas passage 28 (or 27) and the cooling gas passage 33 formed in the porous portion 32 is formed by a groove defined between adjacent ribs 46. In the porous portion 32, only the rib 46 (a portion located closer to a tip of the rib than a bottom surface of the groove) is constructed so as to have a greater pore diameter and a greater porosity than any other portion (a portion between the groove bottom surface of the reactant gas passage 28 (or 27) and the groove bottom surface of the cooling gas passage 33) of the porous portion 32. In FIG. 9, the rib 46 of the reactant gas passage 28 (or 27) has a greater pore diameter and a greater porosity than any other portion of the porous portion, and in FIG. 10, the rib 46 of the coolant gas passage 33 has a greater pore diameter and a greater porosity than any other portion of the porous portion.

When reactant gas flows in the reactant gas passage 28 (or 27) of the porous portion 32, if the pore diameter and porosity of the rib 46 are the same as those of the other portions of the porous portion, the product water in the reactant gas passage 28 (or 27) will move through a groove-bottom portion 47 (having a relatively small flow resistance) of the porous portion 32 to the cooling gas passage 33, because a flow resistance of a flow path from the reactant gas passage 28 (or 27) through the rib 46 to the coolant gas passage 33 is greater than a flow resistance of a flow path from the reactant gas passage 28 (or 27) through the groove-bottom portion 47 to the coolant gas passage 33. However, in embodiment 6 of the present invention, since the rib 46 (a portion located closer to a tip of the rib than a bottom surface of the groove) is constructed so as to have a greater pore diameter and a greater porosity than any other portion (a portion except the rib 46 of the porous portion 32, a flow resistance of a flow path from the reactant gas passage 28 (or 27) through the rib 46 to the coolant gas passage 33 is reduced and is substantially equal to a flow resistance of a flow path from the reactant gas passage 28 (or 27) through the groove-bottom portion 47 to the coolant gas passage 33. As a result, irrespectively of the rib 46 and the groove, product water moves to the cooling gas passage 33 substantially uniformly through almost all regions of the porous portion 32. Therefore, occurrence of flooding can be suppressed over the almost all regions of the porous portion 32.

With embodiment 7 of the present invention, as illustrated in FIG. 11, each of the reactant gas passage 28 (or 27) and the cooling gas passage 33 formed in the porous portion 32 is constructed of a groove defined between adjacent ribs 46. In the porous portion 32, only the rib 46 (a portion located closer to a tip of the rib than a bottom surface of the groove) and a rib-bottom portion 48 (a portion between an extension plane of the groove bottom surface of the reactant gas passage 28 (or 27) and an extension plane of the groove bottom surface of the gas cooling passage 33) are constructed so as to have a greater pore diameter and a greater porosity than any other portion (the groove-bottom portion 47) of the porous portion 32.

When reactant gas flows in the reactant gas passage 28 (or 27) of the porous portion 32, if the pore diameter and porosity of the rib 46 and the rib-bottom portion 48 are the same as those of the other portions of the porous portion, the product water in the reactant gas passage 28 (or 27) will move through a groove-bottom portion 47 (having a relatively small flow resistance) of the porous portion 32 to the cooling gas passage 33, because a flow resistance of a flow path from the reactant gas passage 28 (or 27) through the rib 46 and the rib-bottom portion 48 to the coolant gas passage 33 is greater than a flow resistance of a flow path from the reactant gas passage 28 (or 27) through the groove-bottom portion 47 to the coolant gas passage 33. However, in embodiment 7 of the present invention, since the rib 46 (a portion located closer to a tip of the rib than a bottom surface of the groove) and the rib-bottom portion 48 are constructed so as to have a greater pore diameter and a greater porosity than any other portion (the groove-bottom portion 47) of the porous portion 32, a flow resistance of a flow path from the reactant gas passage 28 (or 27) through the rib 46 and the rib-bottom portion 48 to the coolant gas passage 33 is reduced and is substantially equal to a flow resistance of a flow path from the reactant gas passage 28 (or 27) through the groove-bottom portion to the coolant gas passage 33. As a result, irrespectively of the rib 46 and the groove, product water moves to the cooling gas passage 33 substantially uniformly through almost all regions of the porous portion 32. Therefore, occurrence of flooding can be suppressed over the almost all regions of the porous portion 32.

With embodiment 8 of the present invention, as illustrated in FIG. 12, each of the reactant gas passage 28 (or 27) and the cooling gas passage 33 formed in the porous portion 32 of the separator is constructed of a groove defined between adjacent ribs 46. In the porous portion 32, a rib-to-groove ratio of a gas passage of at least one of the reactant gas passage 28 (or 27) and the cooling gas passage 33 is smaller than a rib-to-groove ratio of any portion of the separator other than the porous potion 32 (i.e., a portion cooled by LLC). In this instance, though a contact surface between separators is small at the porous portion, a demerit (an increase in a contact resistance, etc.) due to the small contact surface is small, because the porous portion is located at a downstream portion of the reactant gas passage 28 (or 27) and therefore, a concentration of reactant gas at the downstream portion is small and an amount of a power generated at the downstream portion is small.

When reactant gas flows in the reactant gas passage 28 (or 27) of the porous portion 32, the product water in the reactant gas passage 28 (or 27) is unlikely to pass through the rib 46 to the cooling gas passage 33, and is likely to pass through the rib 46 to the cooling gas passage 33. In embodiment 8 of the present invention, since the rib-to-groove ratio of a gas passage of at least one of the reactant gas passage 28 (or 27) and the cooling gas passage 33 is smaller than a rib-to-groove ratio of any portion of the separator other than the porous potion 32, an influence of the rib is decreased, so that product water can move to the cooling gas passage 33 substantially uniformly at almost all regions of the porous portion 32. As a result, flooding can be suppressed at the almost all regions of the porous portion 32.

With embodiment 9 of the present invention, as illustrated in FIG. 13 and FIG. 14, the cooling gas passage 33 formed in the porous portion 32 of the separator 18 is filled with electrically conductive porous material 49 which is gas-passable. The porous material 49 forming the cooling gas passage 33 has a greater porosity and a greater pore-diameter than the porous material forming the porous portion 32 thereby decreasing a pressure drop of a flow of the cooling gas. The porous material 49 forming the cooling gas passage 33 is made from porous carbon or porous metal.

The porous material 49 forming the cooling gas passage 33 may be formed integrally with the porous material forming the porous portion 32 as illustrated in FIG. 13, when the porous material 49 is the same material as the porous material forming the porous portion 32, or may be formed separately from the porous portion 32 and be fixed with the porous portion 32 as illustrated in FIG. 14, irrespectively of whether or not the porous material 49 is the same material as the porous material forming the porous portion 32.

Since the cooling gas passage 33 is filled with the electrically conductive porous material 49 which is gas-passable, there are no ribs and grooves, so that the product water can move to the cooling gas passage 33 substantially uniformly at almost all regions of the porous portion 32. Further, since there are no grooves, an electrical contact between the separators is obtained even at the cooling gas passage 33, thereby decreasing an electrical contact resistance.

With embodiment 10 of the present invention, as illustrated in FIG. 15, the fuel cell includes the MEA and the separator 18, and the reactant gas passage is formed in the separator 18 at the MEA opposing surface of the separator. A water-exchange portion 32' is formed in the separator 18, and the cooling gas passage 33 is formed at a surface of the separator opposite to the surface at which the water-exchange portion 32' is formed. Accordingly, in embodiment 10 of the present invention, the porous portion 32 of the other embodiments of the present invention is replaced by the water-exchange portion 32'. The water exchange portion 32' is made from a particular porous material which can shut off gas and can exchange water only. For this porous material a known porous material which does not allow gas to pass in a wet condition but allows gas to pass in a dry condition can be used. It is desirable that this porous material is electrically conductive and of the same kind as a material of the separator 18 from the viewpoint of junction.

In embodiment 10 of the present invention, structures wherein the cooling gas passage 33 is connected on a downstream side thereof to the reactant gas supply passage for supplying reactant gas to the fuel cell and wherein the water exchange portion 32' is formed only in a separator portion where the downstream portion of the reactant gas passage is located are the same as those structures according to the other embodiments of the present invention, and the effects and technical advantages thereof are similar to those of the other embodiments of the present invention.

In embodiment 10 of the present invention, since the water exchange portion 32' allows only water to pass therethrough and does not allow gas to pass therethrough, a first gas flowing in a first gas passage at a first surface of the water exchange portion 32' is allowed to be different from a second gas flowing in a second gas passage at a second, opposite surface of the water exchange portion 32'. Even when different gasses flow in the first and second gas passages, no gas mixture with each other happens. In FIG. 15, air flows along the first surface of the water exchange portion 32' and dry hydrogen flows along the second, opposite surface of the water exchange portion 32'. The dry hydrogen is humidified by water which has come through the water exchange portion 32' from the air flowing in the downstream portion of the oxidant gas passage. The humidified hydrogen flows to the fuel gas passage and is used as reactant gas as it is. As a result, flooding at the downstream portion of the oxidant gas passage is prevented, and a humidifier, which was required to be provided in a conventional system, is not required to be provided.

With embodiment 11 of the present invention, as illustrated in FIG. 16 and FIG. 17, the fuel cell 10 includes an MEA, a first separator 18 disposed on one side of the MEA and a second separator 18 disposed on the other side of the MEA. Reactant gas passages 27 and 28 are formed at the MEA opposing surfaces of the first and second separators, respectively. A portion of at least one of the first separator and the second separator in a direction of the at least one separator from the reactant gas passage-side surface toward the opposite surface, in at least one region of the reactant gas passage-side surface, is made from porous material 51.

The separator 18 may be a carbon separator or a metal separator. In the case of the metal separator, the porous material 51 may be a gas-passable porous sinter.

In the examples of FIG. 16 and FIG. 17, a portion of the separator 18 (the second separator) located in the downstream side of an oxidant gas passage 28 is made porous to form the porous portion 32, and at a surface of the porous portion 32 opposite to the oxidant gas passage-side surface of the porous portion, the cooling gas passage 33 is formed, so that the oxidant gas passage 28 fluidly communicates with the cooling gas passage 33 via the porous portion 32.

Further, in at least a region (all regions in the illustrated example) of a separator surface on the side of the fuel gas passage 27, and in at least a region 28 (all regions except the porous portion 32 in the illustrated example) of a separator surface on the side of the oxidant gas passage 28 except the porous portion 32, a portion in a thickness direction (a direction from one surface toward the other, opposite surface of the separator) on the side of the reactant gas passage 27, 28 (a rib and a portion of a groove-bottom portion of the reactant gas passage) of the separator 18 is made from porous material 51. A portion in the thickness direction (a direction from one surface toward the other, opposite surface of the separator) of the side of the coolant passage 26 of the separator is made from gas-tight (gas-nonpassable) material, so that the reactant gas passage 27, 28 does not communicate fluidly with the coolant passage 26. In the separator 18 in which the porous portion 32 is formed, the portion made from the porous material 51 communicates with the porous portion 32.

When the cooling gas flows in the cooling gas passage 33, water existing in the downstream portion of the reactant gas passage is evaporated into the cooling gas, whereby flooding is prevented. A flow amount of the dry air flowing in the cooling gas passage 33 is adjustable. In the coolant passage 26, LLC (non-freezing liquid, long life coolant) flows. By supplying the reactant gas which has flown through the cooling gas passage 33 to the reactant gas passage 27, 28, drying-up at an inlet of the reactant gas passage 27, 28 is prevented.

The portion made from the porous material 51 may not be formed in a separator in which the porous portion 32 is not formed (the anode-side separator in the illustrated example).

When the portion made from the porous material 51 is formed in the separator in which the porous portion 32 is formed (the cathode-side separator in the illustrated example), the portion made from the porous material 51 may be formed at only one region of the zone where the reactant gas passage is formed. For example, when the porous portion 32 is formed at the downstream portion of the oxidant gas passage 28, the portion made from the porous material 51 may be formed only at the midstream portion of the oxidant gas passage 28, or may be formed at the midstream and upstream portions of the oxidant gas passage 28.

The portion made from the porous material 51 may be formed in each of the groove-bottom portion and the rib defining the reactant gas passage 27, 28, or may be formed only in the rib defining the reactant gas passage 27, 28. A portion of the separator opposite the portion 51 made by the porous material 51 and opposite the reactant gas passage 27, 28 (a portion of the separator on the side where the coolant passage is formed) is made gas-tight (gas-nonpassable).

With respect to technical advantages of embodiment 11 of the present invention, since the porous portion 32 is formed in the separator 18 and cooling gas flows along the surface of the porous portion, water in reactant gas and product water flows through the porous portion 32 into the cooling gas, so that flooding on the side of the reactant gas passage 27, 28 is prevented.

Further, by supplying the cooling gas having absorbed water to the reactant gas passage 27, 28, drying-up at the upstream portion of the reactant gas passage can be prevented.

Further, since a portion of the separator on the side of the reactant gas passage 27, 28 in the thickness direction (the direction from one surface toward the other, opposite surface of the separator) of the separator, in at least one region of the separator except the region where the porous portion 32 is formed, is made from porous material 51, gas-containing water and product water, at the regions except the region where the porous portion 32 is formed, are absorbed by the porous material 51. The water absorbed by the porous material 51 moves, due to capillarity, from the portion where the porous material 51 is formed to the portion where the porous portion 32 is formed, and in turn, from the porous portion 32 into the cooling gas where absorbed by the cooling gas. As a result, flooding at the regions other than the region where the porous portion 32 is formed is prevented, too.

Furthermore, since a portion of the separator on the side of the reactant gas passage 27, 28 in the thickness direction (the direction from one surface toward the other, opposite surface of the separator) of the separator is made from porous material 51, the reactant gas is likely to flow into the ribs defining the groove (i.e., the reactant gas passage 27, 28) therebetween, so that a gas concentration at a portion of the gas diffusion layer 13, 16 pressed by the rib is improved, thereby increasing a power generating ability.

Technical advantages and availability to the industry are as follows:

(1) Since the porous portion is formed in the separator and the cooling gas passage is formed at a surface of the porous portion opposite to a surface where the reactant gas is formed, the fuel cell according to the present invention can perform both of removal (exhaust) of product water and cooling of the fuel cell.

Further, according to the present invention, the following usefulnesses (technical advantages) are obtained:

(2) In the case where the cooling gas passage is fluidly connected with the reactant gas supply passage for supplying reactant gas to the fuel cell, a humidifier for the reactant gas is not required to be provided, or even if provided, can be of a small size.

(3) In the case where a flow amount of the cooling gas passage is controllable, control for removal of water is possible.

(4) In the case where the separator portion is formed only at a separator portion where the downstream portion of the reactant gas passage is located, flooding is effectively suppressed, because the downstream portion of the reactant gas passage and a portion where product water is likely to be generated coincide with each other.

(5) In the case where another (a second) cooling passage is provided at a portion of the separator where the upstream portion of the reactant gas passage is located, by causing cooling water to flow in the second cooling passage, the portion of the separator where the upstream portion is located can be cooled by cooling water which has a greater cooling ability than gas.

(6) In the case where the rib, or the rib and a rib-bottom portion located beneath the rib, of a gas passage of at least one of the reactant gas passage and the cooling gas passage, formed in the porous portion has a greater porosity than any other portion of the porous portion, product water can move to the cooling gas passage at almost all regions of the porous portion, irrespectively of a rib-existing portion or a groove-existing portion of the porous portion.

(7) In the case where a gas passage of at least one of the reactant gas passage and the cooling gas passage has a smaller rib-to-groove ratio at the porous portion than at any portion of the separator other than the porous potion (a portion of the separator cooled by LLC), product water can move to the cooling gas passage at almost all regions of the porous portion, irrespectively of a rib-existing portion or a groove-existing portion of the porous portion.

(8) In the case where the cooling gas passage formed in the porous portion of the separator is filled with a porous material, product water can move to the cooling gas passage at almost all regions of the porous portion.

(9) In the case where gases on opposite sides of the porous portion are of the same kind as each other, no problem happens even if the gasses happen to be mixed with each other.

(10) In the case where a blower is fluidly connected to the cooling gas passage of the separator on the upstream side of the cooling gas passage, the cooling passage is pressurized, so that new reactant gas is supplied from the cooling gas passage through the porous portion to the downstream portion of the reactant gas passage (where a gas concentration has been reduced), As a result, a power generation capacity at the downstream portion of the reactant gas passage is increased.

(11) In the case where a blower is disposed in the connecting passage located on the downstream side of the cooling gas passages of the separator, the pressure at the cooling gas passage of the separator is negative so that at the porous portion, gas flows from the reactant gas passage to the cooling gas passage through the porous portion, whereby product water moves together with the gas flow and removal of product water is promoted.

(12) In the case where the connecting passage is connected to a passage to a vacuum generating device on the downstream side of the cooling gas passage, even if any gas flow blockage by foreign substances happens at the porous portion, the foreign substances can be sucked by generating a vacuum thereby solving the blockage.

(13) In the case where the cooling gas passage is an air passage, the cooling gas humidified as it is can be used for oxidant gas.

(14) In the case where the cooling gas passage is a fuel gas passage, the cooling gas humidified as it is can be used for fuel gas.

(15) In the case where a pair of separators is provided and a cooling gas passage formed in one separator is an air passage while a cooling gas passage formed in the other separator is a fuel gas passage, the cooling gas flowing in the air passage and humidified can be used for oxidant gas as it is, and the cooling gas flowing the fuel gas passage and humidified can be used for fuel gas as it is.

(16) In the case where the water exchange unit allows only water to pass therethrough and does not allow gas to pass therethrough, no problem happens even when different kinds of gasses flow in the passages on opposite sides of the water exchanging unit.

(17) In the case where a portion of the separator in a direction of the separator from a reactant gas passage-side surface toward an opposite surface, in at least one region of the reactant gas passage-side surface, is made from porous material, both of removal (exhaust) of water at the electricity collecting surface and supply of gas to the electrode are improved.

It will be understood that other embodiments of the invention will be readily apparent to a person skilled in the art, the scope of the invention being defined in the appended claims.

The invention of the claim is:

1. A fuel cell comprising:
an MEA; and
a separator including a first surface being opposed to the MEA, said separator further comprising:
a reactant gas passage formed in said separator on said first surface;
a porous portion formed in only a power generating portion of the first surface;
a cooling gas passage formed in a second surface of the separator being opposite to said first surface, and
a coolant passage independent of said cooling gas passage being formed in a portion of said separator where an upstream portion of said reactant gas passage is located,
wherein product water formed in the reactant gas passage is removed into the cooling gas passage.

2. A fuel cell according to claim 1, wherein said cooling gas passage is connected, at a downstream portion of said cooling gas passage, to a reactant gas supply passage for supplying reactant gas to said fuel cell.

3. A fuel cell according to claim 2, wherein gas flow in said cooling gas passage is controllable.

4. A fuel cell according to claim 1, wherein said porous portion is formed in a downstream portion of said reactant gas passage within the power generating portion.

5. A fuel cell according to claim 1, wherein each of said reactant gas passage and said cooling gas passage of said porous portion of said separator is defined by a groove located between adjacent ribs, and
said rib, or said rib and a rib-bottom portion located beneath said rib, of a gas passage of at least one of said reactant gas passage and said cooling gas passage of said porous portion has a greater porosity than any other portion of said porous portion.

6. A fuel cell according to claim 1, wherein each of said reactant gas passage and said cooling gas passage of said porous portion of said separator is defined by a groove between adjacent ribs, and
a gas passage of at least one of said reactant gas passage and said cooling gas passage has a smaller rib-to-groove ratio at said porous portion than at any portion of said separator other than said porous potion.

7. A fuel cell according to claim 1, wherein respective gases flowing along opposite surfaces of said porous portion of said separator are a same gas.

8. A fuel cell according to claim 1, wherein said cooling gas passage of said separator is connected to a blower on an upstream side of said cooling gas passage.

9. A fuel cell according to claim 2, wherein said cooling gas passage of said separator is connected to a blower on a downstream side of said cooling gas passage, the blower being connected upstream of a reactant gas supply passage.

10. A fuel cell according to claim 2, wherein said cooling gas passage of said separator is connected by a passage to a vacuum generating device on a downstream side of said cooling gas passage, the vacuum generating device being connected upstream of a reactant gas supply passage.

11. A fuel cell according to claim 1, wherein said cooling gas passage is an air passage.

12. A fuel cell according to claim 1, wherein said cooling gas passage is a fuel gas passage.

13. A fuel cell according to claim 1, wherein said cooling gas passage is formed in each of a pair of separators disposed on opposite sides of said MEA and opposed to each other, and the cooling gas passage formed in one of said pair of separators is an air passage and the cooling gas passage formed in the other of said pair of separators is a fuel gas passage.

14. A fuel cell according to claim 1, wherein said porous portion includes a water exchange portion which prevents gas from passing through said water exchange portion and allows only water to pass through said water exchange portion.

15. A fuel cell comprising:
an MEA; and
a separator including a first surface being opposed to the MEA, said separator further comprising:
a reactant gas passage formed in said separator on said first surface opposing the MEA of said separator;
a porous portion formed in only a power generating portion of the first surface of said separator;
a cooling gas passage formed in a second surface of the separator being opposite to said first surface, and
a coolant passage independent of said cooling gas passage being formed in a portion of said separator where an upstream portion of said reactant gas passage is located,
wherein a gas that flows through the cooling gas passage and a gas that flows through the reactant gas passage are the same, and
wherein product water formed in the reactant gas passage is removed into the cooling gas passage.

16. A fuel cell comprising:
an MEA; and
a separator including a first surface being opposed to the MEA, said separator further comprising:
a reactant gas passage formed in said separator on said first surface opposing the MEA of said separator;
a porous portion formed in only a portion of the separator where a downstream portion of the reactant gas passage is located;
a cooling gas passage formed in a second surface of the separator being opposite to said first surface, and
a coolant passage independent of said cooling gas passage being formed in a portion of said separator where an upstream portion of said reactant gas passage is located,
wherein product water formed in the reactant gas passage is removed into the cooling gas passage.

17. A fuel cell according to claim 15, wherein said cooling gas passage is an air passage.

18. A fuel cell according to claim 15, wherein said cooling gas passage is a fuel gas passage.

19. A fuel cell according to claim 16, wherein said cooling gas passage is an air passage.

20. A fuel cell according to claim 16, wherein said cooling gas passage is a fuel gas passage.

* * * * *

UNITED STATES PATENT AND TRADEMARK OFFICE
CERTIFICATE OF CORRECTION

| | |
|---|---|
| PATENT NO. | : 7,531,266 B2 |
| APPLICATION NO. | : 10/994345 |
| DATED | : May 12, 2009 |
| INVENTOR(S) | : Seiji Sano et al. |

It is certified that error appears in the above-identified patent and that said Letters Patent is hereby corrected as shown below:

In the Title Page: Before "(51)  Int. Cl." Insert the following:

--(63) Related U.S. Application Data

Continuation of PCT/JP03/00776 filed on Jan. 28, 2003

(30)  Foreign Application Priority Data

June 28, 2002  (JP)    2002-189046

Oct. 02, 2002  (JP)    2002-289347

Dec. 12, 2002  (JP)    2002-360587--.

| Column | Line | |
|---|---|---|
| 1 | 38 | Change "$H_2 \rightarrow 2H_+ + 2e^-$" to --$H2 \rightarrow 2H^+ + 2e^-$--. |

Signed and Sealed this

Seventh Day of July, 2009

JOHN DOLL
*Acting Director of the United States Patent and Trademark Office*